April 9, 1929.  E. R. JACOBI ET AL  1,708,445
RIM CONTRACTING TOOL
Filed June 1, 1926    4 Sheets-Sheet 1
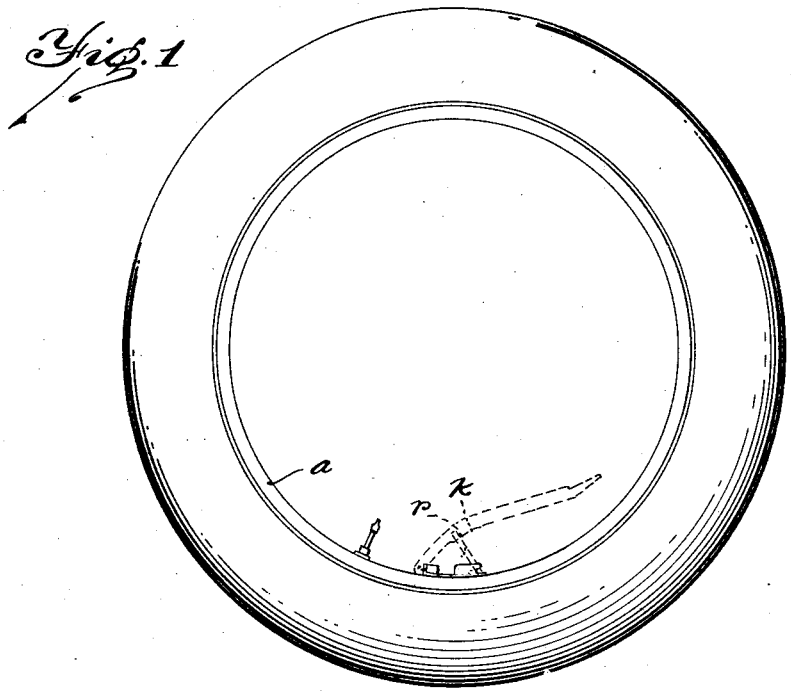
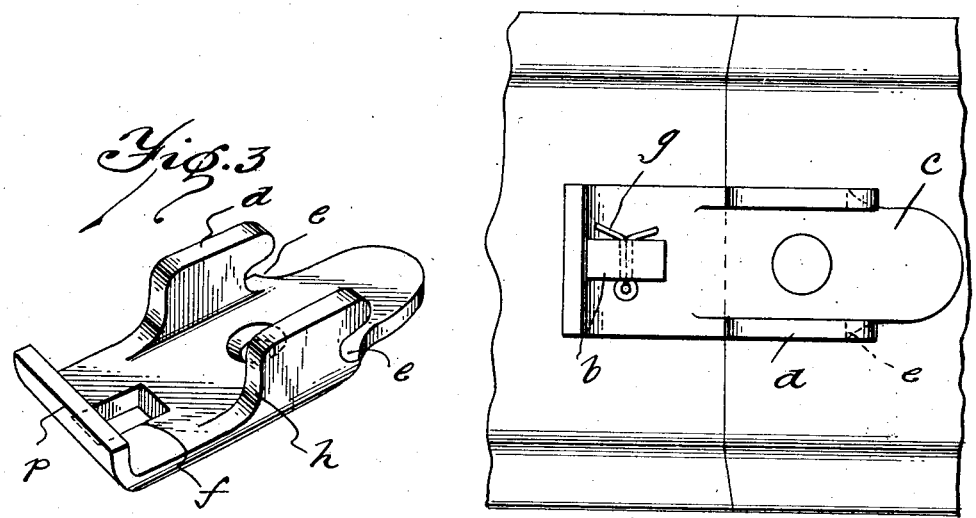
INVENTORS
Emil R. Jacobi
BY Frank H. LeJeune.
Stuart C. Barnes
ATTORNEY.

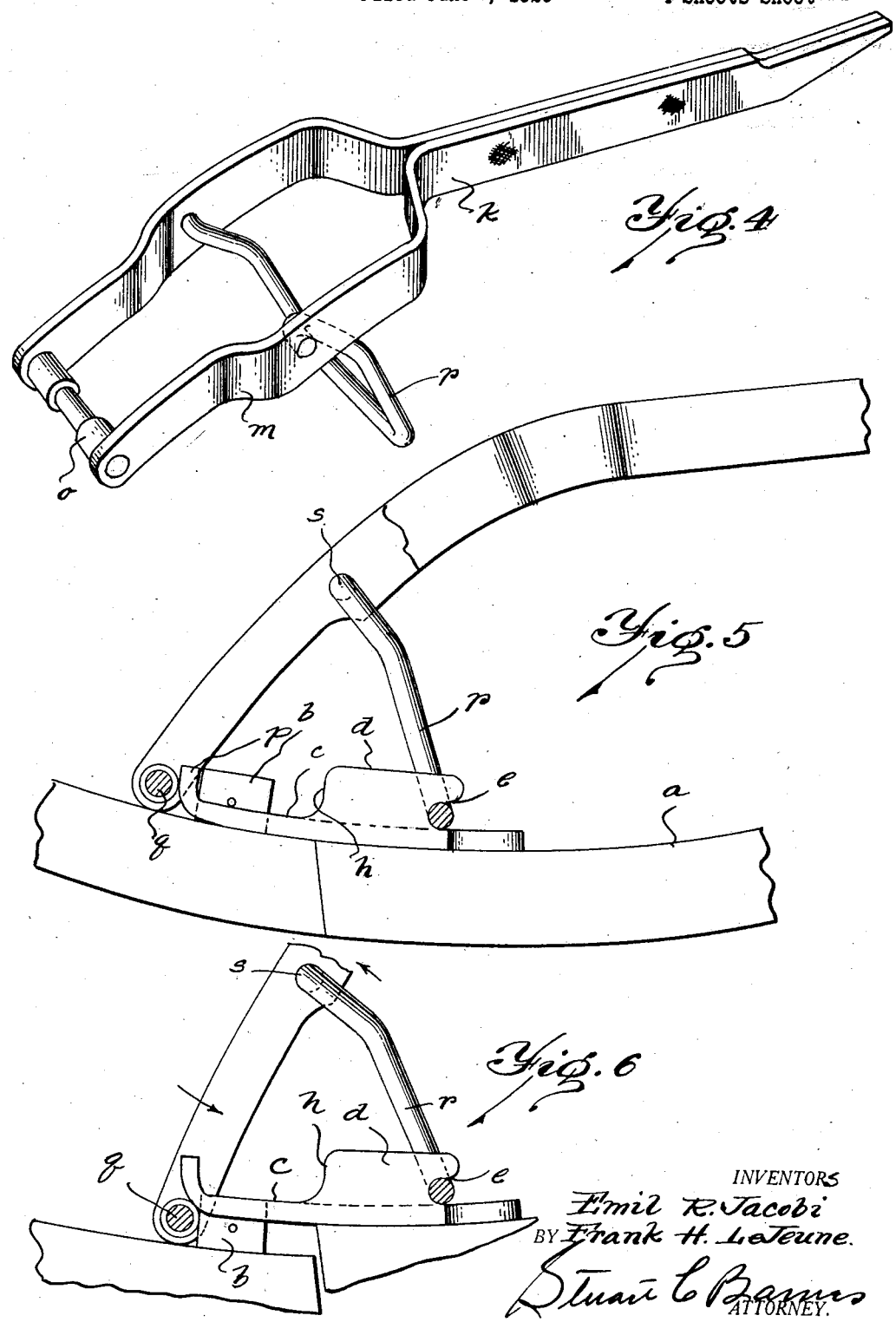

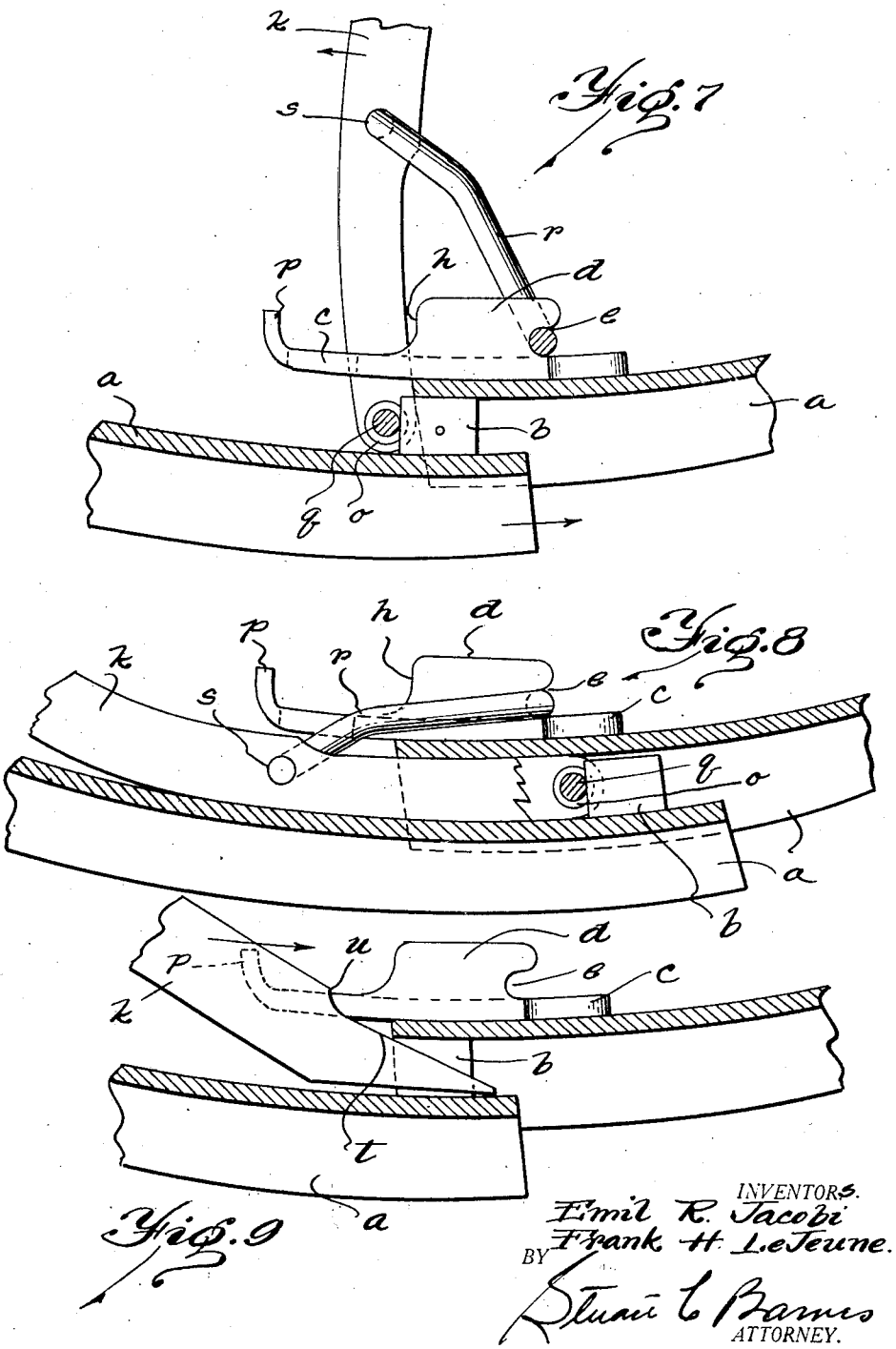

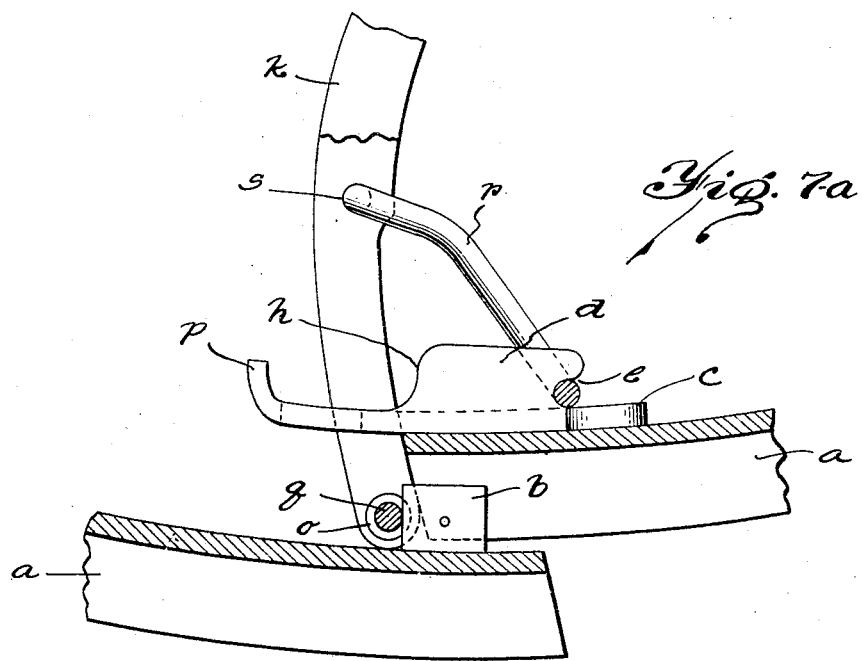
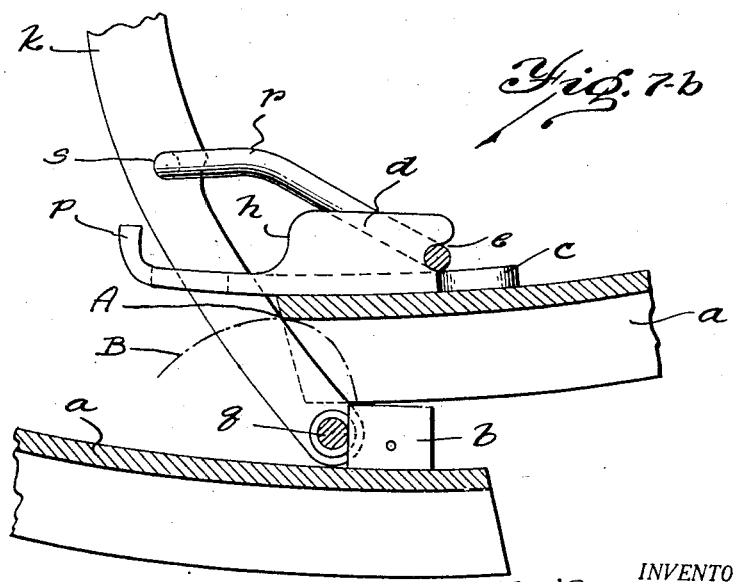

Patented Apr. 9, 1929.

1,708,445

UNITED STATES PATENT OFFICE.

EMIL R. JACOBI AND FRANK H. LE JEUNE, OF JACKSON, MICHIGAN, ASSIGNORS, BY MESNE ASSIGNMENTS, TO KELSEY-HAYES WHEEL CORPORATION, OF DETROIT, MICHIGAN, A CORPORATION OF NEW YORK.

RIM-CONTRACTING TOOL.

Application filed June 1, 1926. Serial No. 113,067.

This invention relates to a demountable rim and rim contracting tool. In a co-pending application Serial No. 113,066 we have described and claimed a special form of tie and driver which is so designed as to also cooperate with the rim contracting tool described and claimed in the present application. However, the tie and driver shown in that application has merits of its own and is capable of being manipulated with a screw-driver or an entirely different rim contracting tool.

In the present application the device is described as a whole but the claims are confined to the tool and the devices provided on the rim to cooperate with the tool. These may or may not be tie devices and they may or may not be driving devices, as will be more fully explained after the structure is described in detail.

It is the object of the present invention to provide a demountable rim and rim contracting tool which can be made at nominal cost, and which very effectively and easily collapses the rim and aids in its expansion when the tire is put back on the rim. This tool is arranged to throw over a center or a point of maximum rim distortion, so that the rim under stress actually holds the tool and the rim in contracted position, as will be more fully explained hereinafter.

While we appreciate that tools of this character are not new, we believe that no tool similar to ours has heretofore been designed, and that no tool that acts as our tool acts is to be found in the prior art. We also appreciate that the combination of a rim and a rim contracting tool is old. However, our tool has a special co-operative relation with the specially designed rim-carried devices so that our tool has a special action due to the peculiar rim devices. In order to bring out this peculiar co-operation, it is necessary to claim the tool in combination with the special rim-carried devices and this combination we believe is entirely new, and has a special co-operative relation above and apart from the ordinary co-operative relation between a rim tool and the rim-carried devices on the rim.

Referring to the drawings:

Fig. 1 is a side elevation of a demountable rim, showing the rim tool in place.

Fig. 2 is a plan view of the rim-carried devices which here happen to be a tie and driver.

Fig. 3 is a perspective of one rim-carried device.

Fig. 4 is a perspective of the tool.

Figs. 5 to 8 inclusive are fragmentary elevational and sectional views, showing the several positions of the tool in contracting the rim.

Figures $7^a$ and $7^b$ are sectional views further showing the operation of the tool.

Fig. 9 is a similar view showing how the opposite end of the tool may be used as a pinch bar to force the rim back into its expanded position.

$a$ designates the demountable rim. On one end of this is fastened a stud $b$. On the other end is fastened a rim-carried device $c$ which is here shown as a tie plate having the lateral ears $d$, which at their outer ends are provided with tool-receiving gullets $e$. Preferably this plate is provided with a slot $f$ arranged to fit over the stud $b$, after which a cotter pin $g$ may be inserted in an opening of the stud to hold the parts together. This forms a very nice tie device for the ends of the rim, and furthermore, the stud $b$ in connection with the inner ends $h$ of the lateral ears can form a bolt-receiving recess to act as a driver in the way described and claimed in our co-pending application. However, so far as the broad subject matter of this application is concerned, these rim-carried devices need not function as a tie or a driver, but another tie device might be used or none at all. On the other hand, these rim-carried devices may be considered as a rim tie, and the subject matter of claims directed to a narrower aspect of the invention, as will be presently pointed out.

In order to contract the rim, the tool is applied to the rim-carrying devices in the manner shown in Fig. 5. The tool comprises a pair of metal straps that are spot-welded together to form a handle $k$ and a yoke or bifurcation $m$. A strut rod $o$ or fulcrum connects the ends of the bifurcated portions while a swinging loop or link $r$ is pivoted to the bifurcations further up. With the lever applied as shown in Fig. 5, the strut bar $q$ is located against the turned up end $p$ of the plate $c$. The end of the loop r is hooked into the gullets e. Now if one pulls up on the lever the first action is the bearing of the strut bar against the turned up end of the plate, and the loop pulls on the plate and the strut bar pushes on the opposite end of the rim separating said rim ends radially. When the plate and the two ends of the rim have been separated sufficiently, the strut bar moves under the plate and abuts against the stud b. It is probable that the force with which the strut bar presses against the up-turned end of the plate aids in raising the plate by sliding under the somewhat curved end of the plate.

In the first division of its work, the lever serves to lift the plate c partially up off the stub b. In this function the lever is performing something more than simply a rim contracting function,—to wit: it is serving the additional purpose of helping to disengage the tie members and separate the rim ends. The final disengagement is made, however, in the second division of its work.

One of the features of this tool is that the stress under which the rim labors when distorted actually keeps the rim locked in a contracted position. This is not broadly new, but so far as we are aware, it is new in connection with this type of tool. Apparently after the load point of the loop, namely, where it bears against the gullets, passes the radius through the fulcrum of the lever, the maximum distortion of the rim is reached, for at this point the greatest pressing of the one end radially inwardly takes place. This function is not broadly new, but we believe is new with a lever and link tool, for this throw over a point of maximum distortion can only be accomplished with such a tool when there is something to guide the end of the rim in a path inwardly on what approximates an arc. This has been previously done by a special hinge on the two rim members as in Funk, No. 1,146,421, but so far as we are aware it has not been done by the tool itself. With our tool the rim end rides up the face of the tool, as shown at A, Fig. 7ᵇ, and is compelled to take the path marked out by the arc B, Fig. 7ᵇ. Shortly after the rim end passes this radius, although it is caused to overlap more, the distortion is less; consequently instead of having to force the lever down as it passes this point, the stress of the rim itself will automatically force the lever down and keep it in locked position. This, of course, is very advantageous and eliminates the necessity of any hook devices or the accidental displacing of the tool, and possible injury to the operator, or any hinge devices on the rim itself.

In expanding the rim, the tool itself is pulled back over the center or point of maximum stress, and thereupon the stress of the rim will force the one end onto the top of the stud, as shown in Fig. 9. The lever may thereupon be reversed and the beveled end t with the shoulder u used as a pinch bar to pry the parts back into the expanded position. This is very easily done, for the stress of the distorted parts tends to aid the ends springing back in their proper position.

It will be noticed that the strut rod is reduced in the middle to centrally locate the tool. The bifurcated ends of the tool are slightly contracted to prevent the link or loop swinging through. The bifurcated portions are long enough so that the valve stem will pass between in operating the tool.

One of the great advantages of this tool is that it can be made very cheaply. The lever part of the tool is formed by two strap metal pieces that can be stamped by dies to the proper configuration and then spot-welded together. The loop is simply a piece of heavy bent wire and the strut rod is a piece of rod stock. This tool can be made for a few cents, and consequently can be furnished as part of the equipment with every set of rims or wheels sold the automobile manufacturer, without in any way materially varying the price the wheel-maker charges the automobile manufacturer. This, we believe, is quite an advance in the practical art of wheel building; so far as we are aware it has not been the custom to provide rim-contracting tools as standard equipment in tool kits.

What we claim is:

1. A tool for collapsing a transversely split rim having a stud affixed to one rim end and a tie plate affixed to the other rim end and formed with an undercut surface at the end attached to the other rim end, and a transverse surface at the end overlapping the first mentioned rim end, said tool being constructed to radially separate the rim ends and then force the rim ends into overlapping position and comprising a lever having a portion for bearing on the first mentioned rim end and a second portion for successively engaging and cooperating with the transverse surface of the tie plate and the stud, and a link pivoted to the lever for engaging the undercut surface of the tie plate, the second portion of the lever being adapted to pass between the tie plate and the first mentioned rim end into engagement with the stud.

2. A tool for collapsing a transversely split rim having a stud affixed to one rim end and a tie plate affixed to the other rim end and having an undercut surface attached to the rim end and a cam surface at the end overlapping the first mentioned rim end, said tool being constructed to radially separate the rim ends and then force the rim ends into overlapping position and comprising a bifurcated lever having a fulcrum extending between the furcations for engagement with the first mentioned rim end and for temporary engagement with the cam surface of the tie plate, and a looped link pivoted to the lever intermediate its ends for engagement with the undercut surface of the tie plate, said tool being constructed so that upon swinging the lever the fulcrum of the lever is forced between the tie plate and the first mentioned rim end from engagement with the cam surface of the tie plate to engagement with the stud.

In testimony whereof we have affixed our signatures.

EMIL R. JACOBI.
FRANK H. LE JEUNE.